UNITED STATES PATENT OFFICE.

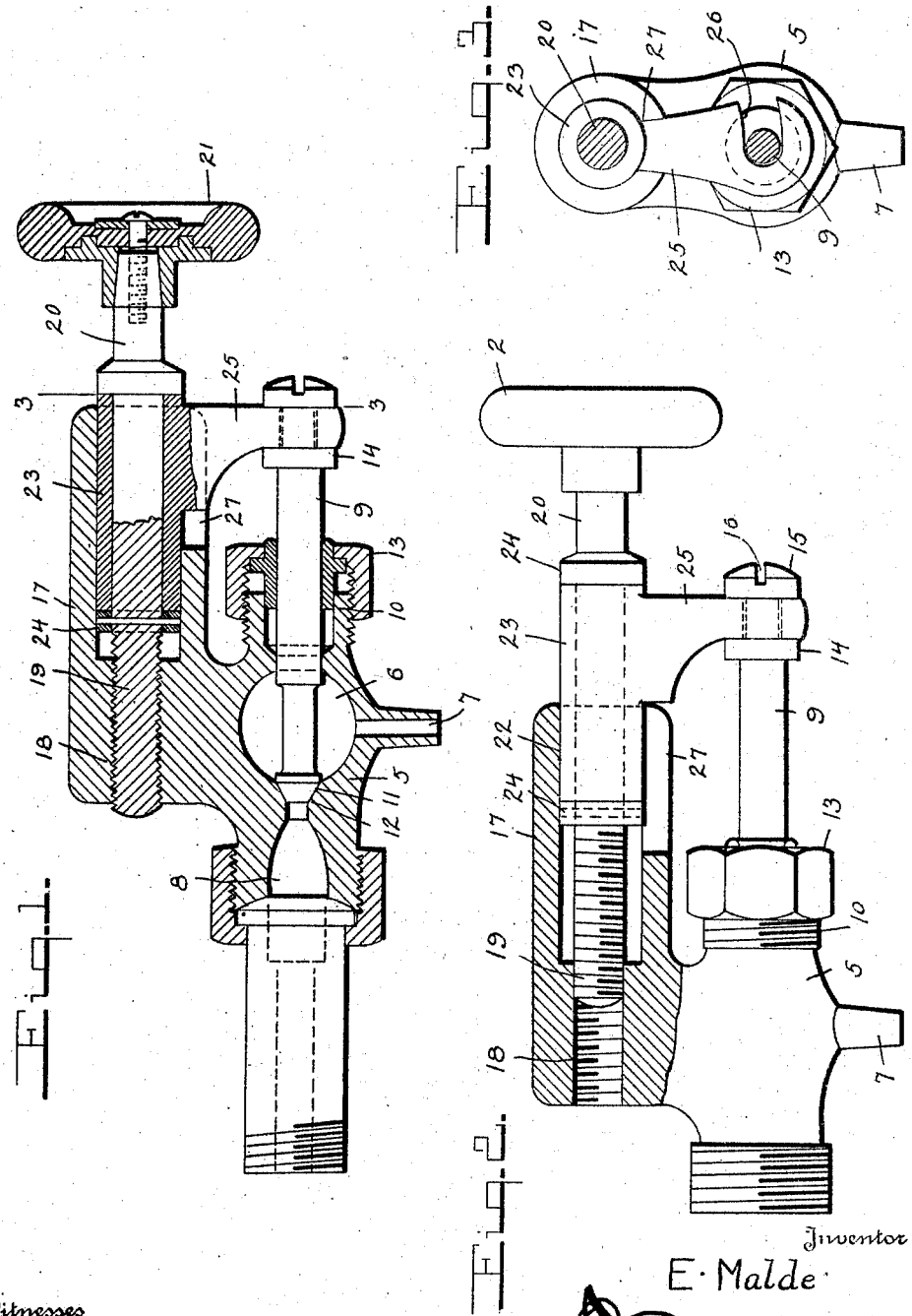

EMIL MALDE, OF PORTLAND, OREGON.

VALVE.

1,307,915.  Specification of Letters Patent.  Patented June 24, 1919.

Application filed March 30, 1918. Serial No. 225,706.

*To all whom it may concern:*

Be it known that I, EMIL MALDE, a citizen of the United States, residing at Portland, in the county of Multnomah and State of Oregon, have invented certain new and useful Improvements in Valves; and I do hereby declare the following to be a full, clear, and exact description of the invention, such as will enable others skilled in the art to which it appertains to make and use the same.

This invention relates to improvements in valves, and has for its object to provide an improved valve especially designed for use in connection with water gages of locomotives, although it is not necessarily limited to such use.

Another object is the provision of means for expeditiously adjusting the valve including means whereby the valve may be quickly and conveniently removed independently of the adjusting means to facilitate grinding, repair or replacement.

With this and other objects in view, the invention consists in the novel construction, combination and arrangement of parts as will be hereinafter specifically described, claimed and illustrated in the accompanying drawing, in which:

Figure 1 represents a longitudinal sectional view through the valve,

Fig. 2 represents a side elevation thereof, partly in section, showing the valve in open position, and Fig. 3 represents a transverse sectional view on the line 3—3 of Fig. 1.

Referring to the drawing in detail, wherein similar reference numerals designate corresponding parts throughout the several views, the numeral 5 indicates the valve casing, which is formed with the internal chamber 6 communicating with the inlet and outlet ports 7 and 8, respectively. A cylindrical stem 9 is slidably supported in a tubular extension 10 formed integral with the casing 5 and is provided with a tapered or beveled inner terminal or valve 11 movable against a restricted portion 12 of the casing constituting a seat therefor. The stem 9 of the valve is extended exteriorly of the casing 5 and a packing ring 13 is fitted upon the outer terminal of the extension 10 and is designed to prevent the fluid passing through the valve casing from escaping around the stem 9.

The outer exposed terminal of the stem 9 is formed with an integral or relatively stationary collar or flange 14, which is arranged in spaced relation to an integral head 15, having a slot 16 therein to receive the blade of a screw driver or other suitable tool, whereby the valve 11 may be rotated as is necessary in the operation of grinding.

The casing 5 is formed with an integral stud or enlargement 17, having an internally screw threaded opening 18 therein, which receives the screw threaded terminal 19 of the adjusting rod 20. A hand wheel 21 is detachably secured to one end of the rod 20 and the end of the opening 18 adjacent the hand wheel 21 is increased in diameter, as indicated at 22, to receive the rotatable sleeve 23 supported upon the rod 20. The sleeve 23 is confined between collars 24 secured in spaced relation upon the rod 20.

An ear 25 is rigidly secured to or formed integral with the sleeve 23 and is formed in its outer or lower terminal with a curved slot 26, adapted to receive the portion of the valve stem 9 intermediate the collar 14 and the head 15. The hollow enlargement 17 is formed with a slot 27, communicating with the enlarged terminal 22 of the opening therethrough and adapted to receive the ear 25, whereby the sleeve 23 is held against rotation when advanced inwardly toward the casing 5.

From the foregoing it is clearly evident that the valve 11 may be conveniently and accurately adjusted by the rod 20 and hand wheel 21, the screw threaded terminal 19 of the rod moving in the threaded portion 18 of the opening through the enlargement 17. Accumulations of dirt or other matter upon the working face of the valve 11, incident to extended use of the valve, may be quickly removed by adjusting the rod 20, so as to move the valve against the seat 12 and subsequently turning the valve with a suitable tool inserted in the slot 16 of the head 15. When it is desired to remove the valve for inspection, or for any other purpose, the screw threaded rod 20 is moved outwardly so as to disengage the ear 25 from the slot 27. When the ear 25 is disengaged from the slot 27, it may be swung outwardly so as to disengage the stem 9 and permit the latter, together with the valve 11 to be removed from the casing 5.

What I claim is:

1. A valve structure including a casing having an internal chamber and inlet and outlet ports communicating therewith, a seat formed in said casing, a valve movable against said seat, a stem carried by the valve, a screw threaded rod fitted in said casing, a sleeve mounted upon said rod and rotatable within said casing, said rod being rotatable in said sleeve, means to normally retain said sleeve against rotary movement with relation to said casing, and means carried by said sleeve releasably engaging said stem for adjusting the latter together with the valve.

2. A valve structure including a casing having a valve seat therein, a valve coöperating with said seat and including a stem, a rod movable in said casing to adjust said valve, and a connection between said rod and stem rotatable within the casing and normally prevented from rotation, said rod being rotatably mounted in said connection whereby the valve is adjusted when the rod is moved.

3. A valve structure including a casing having a valve seat therein, a valve coöperating with said seat and including a stem, a rod movable in said casing to adjust said valve, and a connection between said rod and stem rotatable within the casing and normally prevented from rotation by engagement with the casing, the rod being rotatably mounted in said connection, whereby the valve is adjusted when the rod is moved.

4. A valve structure including a casing having a valve seat therein, a valve coöperating with said seat and including a stem, a rod movable in said casing to adjust said valve, and a connection between said rod and stem rotatable within the casing and normally prevented from rotation by engagement with the casing, the rod being rotatably mounted in the connection, whereby the valve is adjusted when the rod is moved, said connection being movable out of engagement with said casing by said rod, whereby the connection may be rotated and detached from said stem to permit of the removal of the valve from the casing.

5. A valve structure including a casing having a valve seat therein, a valve coöperating with said seat and including a stem, a rod movable in said casing to adjust said valve, a sleeve rotatable within the casing and normally engageable therewith whereby rotation of the sleeve is prevented, the rod being rotatable in said sleeve, and means carried by the sleeve and engageable with said stem to adjust the same and said valve when said rod is moved.

6. A valve structure including a casing having a valve seat therein, a valve coöperating with said seat and including a stem, a rod movable in said casing to adjust said valve, a sleeve rotatable within the casing and normally engageable therewith whereby rotation of the sleeve is prevented, the rod being rotatably mounted in said sleeve, and means carried by the sleeve and engageable with said stem to adjust the same and said valve when said rod is moved, said sleeve being adjustable out of engagement with said casing when the rod is moved in one direction to permit of a rotation of the sleeve about the rod, whereby said means may be disengaged from said stem.

In testimony whereof I affix my signature in presence of two witnesses.

EMIL MALDE.

Witnesses:
H. H. NEWHALL,
F. W. ALT, Jr.

Copies of this patent may be obtained for five cents each, by addressing the "Commissioner of Patents, Washington, D. C."